(12) United States Patent
Gauthier et al.

(10) Patent No.: US 7,013,254 B2
(45) Date of Patent: Mar. 14, 2006

(54) LOW-COMPLEXITY, HIGH ACCURACY MODEL OF A CPU POWER DISTRIBUTION SYSTEM

(75) Inventors: Claude R. Gauthier, Fremont, CA (US); Brian W. Amick, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 887 days.

(21) Appl. No.: 09/819,773

(22) Filed: Mar. 28, 2001

(65) Prior Publication Data

US 2002/0143514 A1     Oct. 3, 2002

(51) Int. Cl.
*G06F 17/50*     (2006.01)
(52) U.S. Cl. .................. 703/18; 703/2; 716/1; 307/82; 363/65
(58) Field of Classification Search ................ 713/300; 307/58, 82; 703/2, 18; 716/1; 363/65
See application file for complete search history.

(56) References Cited

U.S. PATENT DOCUMENTS

| | | | | |
|---|---|---|---|---|
| 5,694,344 A | * | 12/1997 | Yip et al. .................... | 703/2 |
| 5,737,202 A | * | 4/1998 | Shimamori ................. | 363/65 |
| 6,385,565 B1 | * | 5/2002 | Anderson et al. ............ | 703/18 |

FOREIGN PATENT DOCUMENTS

WO     WO 01/17111 A1     3/2001

OTHER PUBLICATIONS

Herrell et al (Modeling of Power Distribution Systems for High-Performance Microprocessors, IEEE, 1999).*
Blaauw et al., D. On-Chip Inductance Modeling, Proceedings of the 10th Great Lakes Symposium on VLSI, Mar. 2000, pp. 75-80.*
Michalka, T.L. Modeling the Power Rails in Leading Edge Microprocessor Packages, 48th IEEE Electronic Components and Technology Conference, May 1998,pp. 598-604.*
Beker et al., B. Tradeoffs in Modeling the Response of Power Delivery Systems of High-Performance Microprocessors, IEEE Conference on Electrical Performance of Electronic Packaging, Oct. 2000, pp. 77-80.*

(Continued)

*Primary Examiner*—Russell Frejd
(74) *Attorney, Agent, or Firm*—Osha Liang LLP

(57) ABSTRACT

A low-complexity, high accuracy model of a CPU power distribution system has been developed. The model includes models of multiple power converters that input to a board model. The board model then inputs to a package model. Finally, the package model inputs to a chip model. The model provides a high degree of accuracy with an acceptable simulation time.

31 Claims, 6 Drawing Sheets

OTHER PUBLICATIONS

IEEE Transactions on Advanced Packaging, Aug. 1999, vol. 22, No. 3, pp. 284-291: "Power Distribution System Design Methodology and Capacitor Selection for Modern CMOS Technology", L.D. Smith, R. E. Anderson, D. W. Forehead, T. J. Pelc and T. Roy.

IEEE Transactions on Advanced Packaging, Aug. 1999, vol. 22, No. 3, pp. 240-248: "Modeling of Power Distribution Systems for High Performance Microprocessors", Dennis J. Herrell and Benjamin Beker.

Dennis J. Herrell, et al.; "Modeling of Power Distribution Systems for High-Performance Microprocessors"; IEEE Transactions on Advanced Packaging; vol. 22, No. 3, Aug. 1999, pp. 240-248.

Wiren D. Beker, et al.; "Modeling, Simulation, and Measurement of Mid-Frequency Simultaneous Switching Noise in Computer Systems"; IEEE Transactions on Components, Packaging, and Manufacturing Technology—Part B; vol. 21, No. 2, May 1998; pp. 157-163.

Mondira Deb Pant, et al.; "On-Chip Decoupling Capacitor Optimization Using Architectural Level Current Signature Prediction"; 13th Annual IEEE International ASIC/SOC Conference; Sep. 13-16, 2000; pp. 288-292.

PCT International Search Report dated Mar. 28, 2002, 3 pgs.

Benjamin Beker, et al.; "Tradeoffs in Modeling the Response of Power Delivery Systems of High-Performance Microprocessors"; IEEE 9th Topical Meeting on Electrical Performance of Electronic Packaging, Scottsdale, AZ, Oct. 23-25, 2000; pp. 77-80.

\* cited by examiner

LOW-COMPLEXITY, HIGH ACCURACY MODEL OF A CPU POWER DISTRIBUTION SYSTEM

BACKGROUND OF INVENTION

1. Field of the Invention

The invention relates generally to circuitry design, more specifically, the invention relates to modeling of power distribution systems for a central processing unit system.

2. Background Art

As today's computer systems operate at frequencies exceeding 1 GHz, the demands on internal power supplies also increase. For instance, as the technology is scaled smaller and faster, the power supply voltage must decrease. However, as the internal clock rates rise and more functions are integrated into microprocessors and application specific integrated circuits (ASICs), the total power consumed must increase. These demands require the internal power supply to respond quickly and reliably without significant overshoot, undershoot, or ringing of the supplied voltage.

Obviously, the design of the power system is critical to meeting these stringent requirements. A critical part of the design process is the modeling of the system. Typically, a model is used to simulate the system's performance so that design decisions can be made based on its results. The key questions in developing a model are: (1) the level of complexity it will entail; and (2) the degree of accuracy it will provide with its results. As a general rule, a more complex model has greater accuracy in its results. However, a complex model may take several days of operation just to simulate a few micro-seconds of system time.

FIG. 1 shows a prior art depiction of a central processing unit (CPU) power distribution system 10 with power system components that must be simulated by such a model. The main circuit board 12 itself is the central platform with the system power supply board 14 and system ground board 16 layered underneath. Attached to the surface of the board 10 is the circuit package 18 that holds the central processing unit 20 or "chip". Also shown are various components of the power system including: high-capacity ceramic capacitors 22; an air-core inductor 24; a regulating integrated circuit 26; switching transistors 28; a mid-capacity tantalum capacitor 30; and low-capacity electrolytic capacitors 32.

Of these components, the model of the chip 20 is the most difficult to develop. The components on the chip that must be modeled include the current draw of the chip as well as its intrinsic capacitance. The current draw generally includes characteristics such as average, maximum, and minimum currents at different processes and speed grades. Additionally, the chip model should allow multiple different current spikes at different known magnitudes and frequencies.

Modeling the current draw of the chip is accomplished by several methods including the use of transistors, resistors, or current sources. A transistor based model requires a tremendous amount of transistors to model the current performance over time. Additionally, the different transient currents must be included in the model. Also, the parasitic capacitance must be sized to be close to the actual value on the chip. The result is a complex circuit that does not scale well and has difficulty maintaining the proper amount of intrinsic capacitance. Finally, the circuit is so complicated that it has a simulation time that unacceptably long.

A resistor based model uses resistance controlled voltage to model the current performance over time. It is relatively easy to determine the necessary voltage and resistance that causes the average, maximum, and minimum currents. The intrinsic capacitance is easily modeled as a voltage controlled capacitor. However, the current draw during transient sweeps is hard to control when attempting to overlay different frequency and magnitude spikes. An additional problem involves modeling transient currents. The voltage controlled resistors often cause the transient currents to have a higher than accurate frequency. The result is that while a resistor based model has a short simulation time, it is not accurate in certain circumstances.

A current source based model uses explicit current sources to model the current performance over time. A voltage controlled capacitor is used to model the intrinsic capacitance. This model has an even faster simulation time than the resistor based model. However, the current sources cannot be used in the AC sweeps since they are not represented as resistors in the AC domain. As with the resistor based model, the current source based model has excellent simulation time but it is not accurate in certain circumstances.

SUMMARY OF INVENTION

In some aspects, the invention relates to an apparatus for modeling a power system of a microprocessor based system, comprising: a plurality of power converter models; a board model that receives an output from the plurality of power converter models; a package model that receives an output from the board model; and a chip model that receives an output from the package model In other aspects, the invention relates to an apparatus for modeling a power system of a microprocessor based system, comprising: means for modeling a power converter; means for modeling a board that receives an output from the means for modeling a power converter; means for modeling a package that receives an output from the means for modeling a board; and means for modeling a chip that receives an output from the means for modeling a package.

In other aspects, the invention relates to a method for modeling a power system of a microprocessor based system, comprising: modeling a plurality of power converters; modeling a board that receives an output from the plurality of power converter; modeling a package that receives an output from the board; and modeling a chip that receives an output from the package.

In other aspects, the invention relates to an apparatus for modeling a power system of a microprocessor chip, comprising: a plurality of bump and grid models; a plurality of section models that receives a plurality of outputs from the plurality of bump and grid models; and a plurality of channel models that interconnect the plurality of section models.

In other aspects, the invention relates to an apparatus for modeling a power system of a microprocessor chip, comprising: means for modeling a plurality of bumps and grids; means for modeling a plurality of sections that receives a plurality of outputs from the plurality of bumps and grids; and means for modeling a plurality of channels that interconnect the plurality of sections.

In other aspects, the invention relates to a method for modeling a power system of a microprocessor chip, comprising: modeling a plurality of bump and grid components; modeling a plurality of chip sections that receives an output from the plurality of bump and grid components; and modeling a plurality chip channels that interconnect the plurality of chip sections.

Other aspects and advantages of the invention will be apparent from the following description and the appended claims.

DETAILED DESCRIPTION

Figure 1:
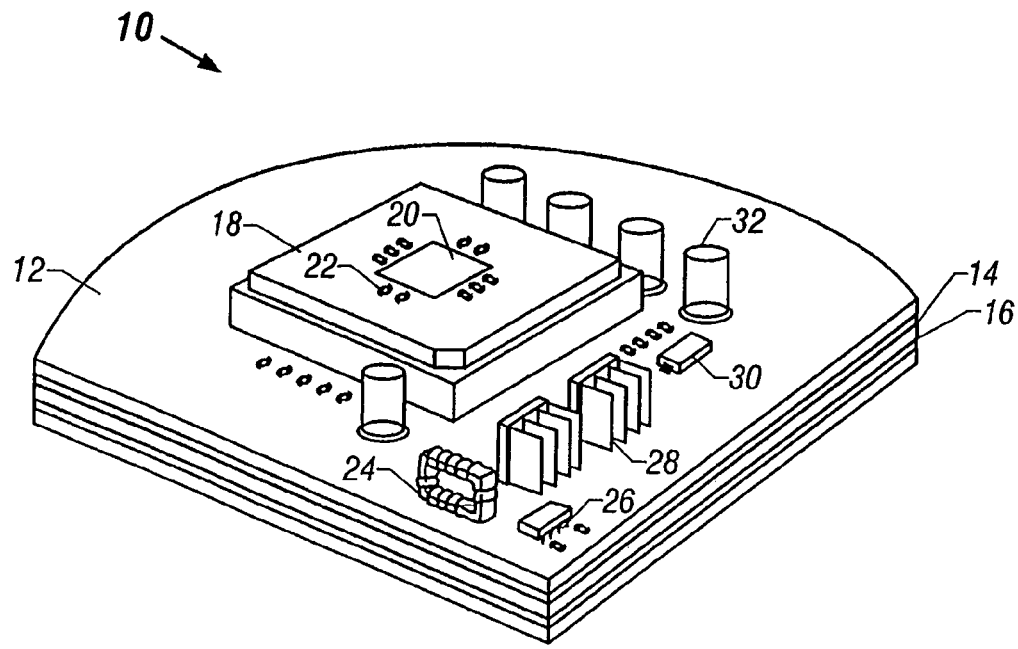
FIG. 1 shows a prior art depiction of a central processing unit (CPU) power distribution system with power system components.

Exemplary embodiments of the invention will be described with reference to the accompanying drawings. Like items in the drawings are shown with the same reference numbers.

Figure 2:
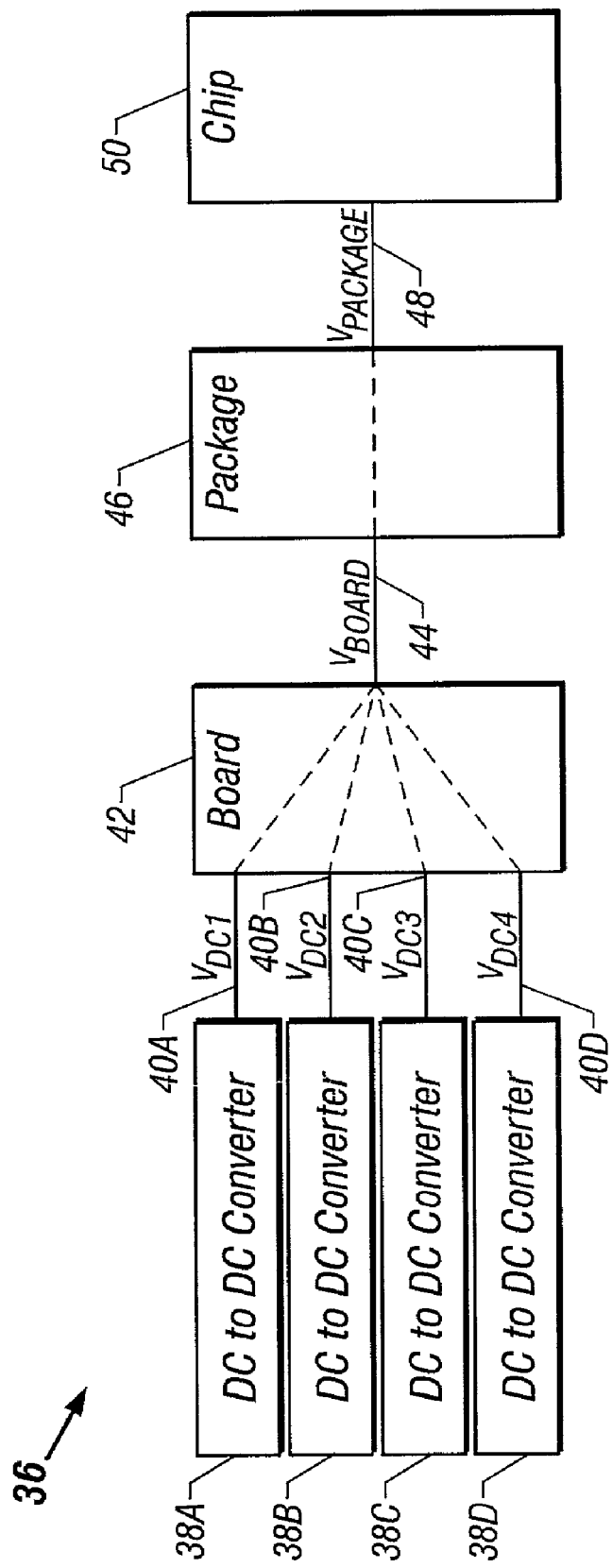
FIG. 2 shows a block diagram of a power system model in accordance with one embodiment of the present invention.

FIG. 2 shows a block diagram 36 of a model for a power system in accordance with one embodiment of the present invention. The model begins with four DC to DC converters 38a–38d that are connected to the board 42. The converters 38a–38d are each connected to the board 42 with a separate path or "via". These vias are labeled $V_{DC1}$ 40a, $V_{DC2}$ 40b, $V_{DC3}$ 40c, and $V_{DC4}$ 40d. Once the vias 40a–40d reach the board 42, they are combined into a single via labeled $V_{BOARD}$ 44. This path 44 connects the board 42 to the package 46. Finally, a via labeled $V_{PACKAGE}$ 48 connects the package 46 to the chip 50. Each of the blocks for the DC to DC converters 38a–38d, the board 42, the package 46, and the chip 50 represents a model of that specific component of the power system. Each of these models is made up of various circuitry devices that simulate the performance of the respective components. The selection of the specific values of these circuitry devices is accomplish by methods well known in the art. When models of the components 38a–38d, 42, 46, 50 are arranged and connected in the manner shown in FIG. 2, they will properly simulate the function and performance of the power system accurately and in an acceptable simulation timeframe.

While FIG. 2 shows four DC to DC converters 38a–38d, one board 42, one package 46, and one chip 50, it is fully intended that the scope of this invention covers embodiments with differing numbers of each of these components. For example, in a parallel processing environment, the system may have a plurality of package and chip blocks. The end result is that different arrangements and numbers of the component blocks shown in FIG. 2 are dependent upon the components present in the system to be modeled and are not limited to the embodiment shown here. Nevertheless, it is conceivable that multiple components (e.g., multiple chips in a parallel processing system) could be modeled by a single component block by simply adjusting the values of the circuitry devices in the respective block to represent the cumulative characteristics of multiple components.

Figure 3:
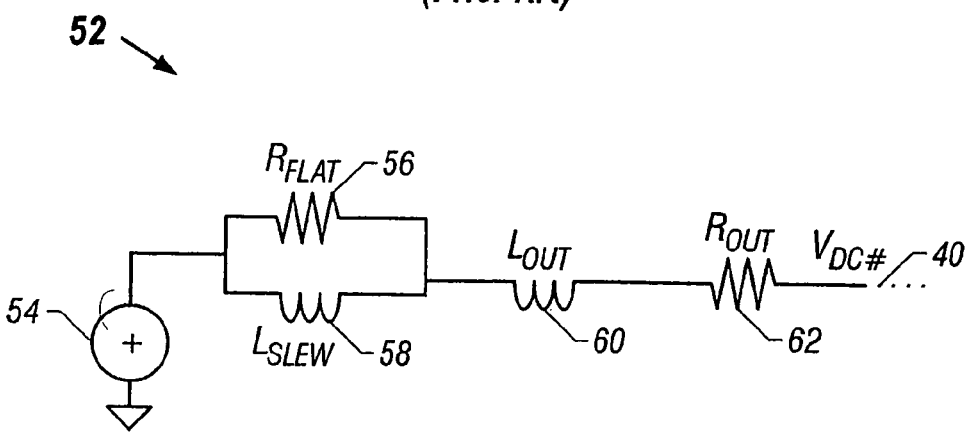
FIG. 3 shows a circuit model of a DC to DC converter in accordance with one embodiment of the present invention.

FIG. 3 shows a schematic 52 of a circuit model of a DC-DC converter in accordance with one embodiment of the present invention. The schematic 52 includes a DC voltage supply source 54 that is connected in series to a resistor $R_{FLAT}$ 56 and an inductor $L_{SLEW}$ 58. As shown in the figure, $R_{FLAT}$ 56 and $L_{SLEW}$ 58 and connected to each other in parallel. $R_{FLAT}$ 56 represents the equivalent series resistance (ESR) of the converter capacitor, while $L_{SLEW}$ 58 serves to limit the current flow from the voltage supply 54. Both $R_{FLAT}$ 56 and $L_{SLEW}$ 58 are connected in series to $L_{OUT}$ 60 and $R_{OUT}$ 62 that represent the output inductance value and the output resistance value respectively. $R_{OUT}$ 62 is connected to board (not shown) through the via $V_{DC\#}$ 40. The values of each supply source 54, each resistor 56, 62, and each inductor 58, 60 are selected to accurately simulate the performance of its specific modeled component.

Figure 4:
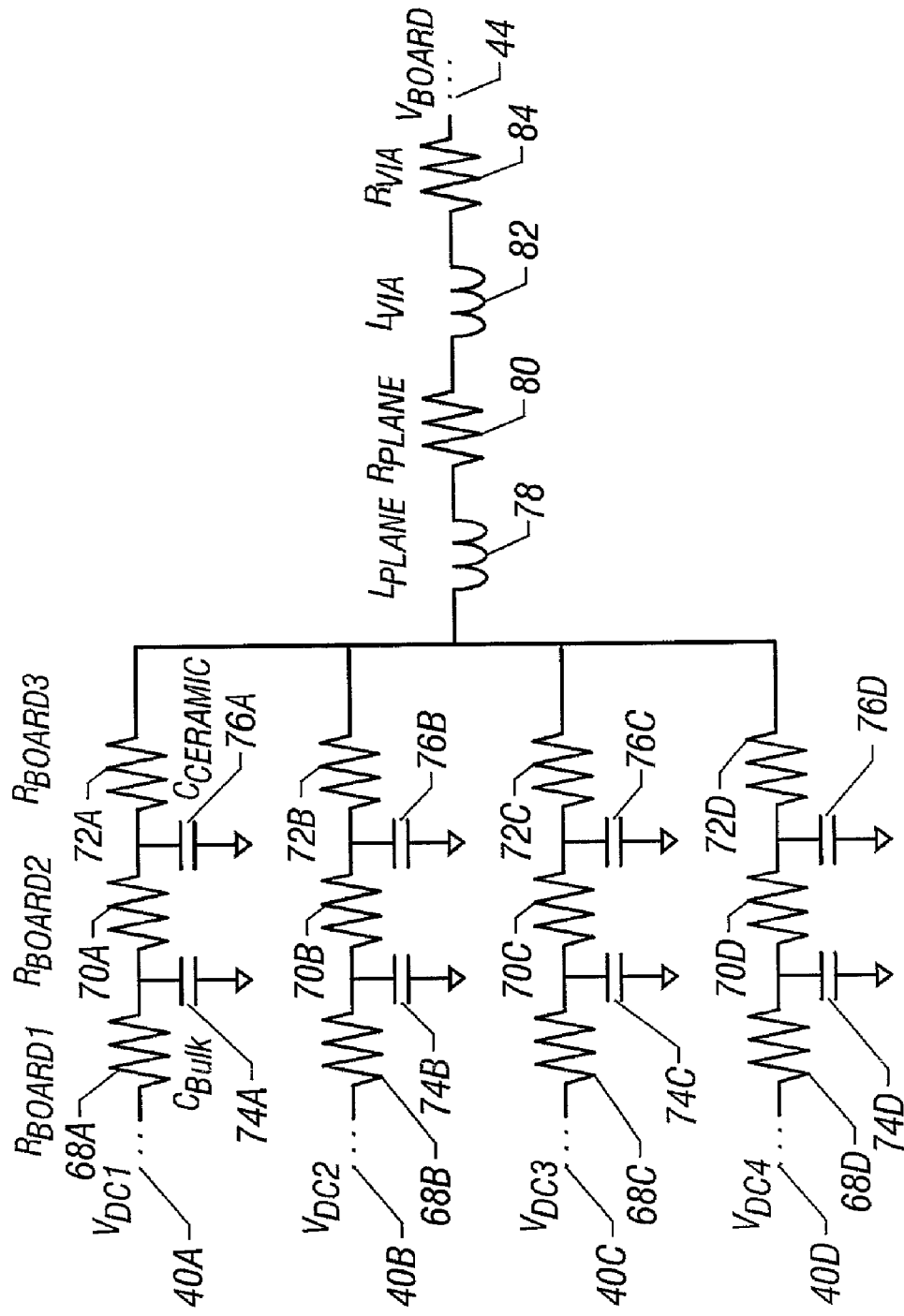
FIG. 4 shows a circuit model of a board in accordance with one embodiment of the present invention.

FIG. 4 shows a schematic of a circuit model of a board in accordance with one embodiment of the present invention. Four separate vias 40a–40d are shown as inputs to the board. These vias, labeled $V_{DC1}$ 40a, $V_{DC2}$ 40b, $V_{DC3}$ 40c, and $V_{DC4}$ 40d, are connected to their respective DC to DC converter as shown in FIG. 2. On the board, each via 40a–40d is connected to its own pathway. The pathways are identical to each other and the are connected in parallel. The pathways for each via include three resistors connected in series: $R_{BOARD1}$ 68a; $R_{BOARD2}$ 70a; and $R_{BOARD3}$ 72a. Also included is a bulk capacitor labeled $C_{BULK}$ 74a and a ceramic capacitor labeled $C_{CERAMIC}$ 76a. The bulk capacitor 74a is connected to the system ground between $R_{BOARD1}$ 68a and $R_{BOARD2}$ 70a, while the ceramic capacitor 76a is connected to the system ground between $R_{BOARD2}$ 70a and $R_{BOARD3}$ 72a. In the pathway, $R_{BOARD1}$ 68a represents the resistance between the DC to DC converter and the bulk capacitor 74a. $R_{BOARD2}$ 70a represents the resistance between the bulk capacitor 74a and the ceramic capacitor 76a. $R_{BOARD3}$ 72a represents the resistance between the ceramic capacitor 76a and the perforated plane.

Figure 5:
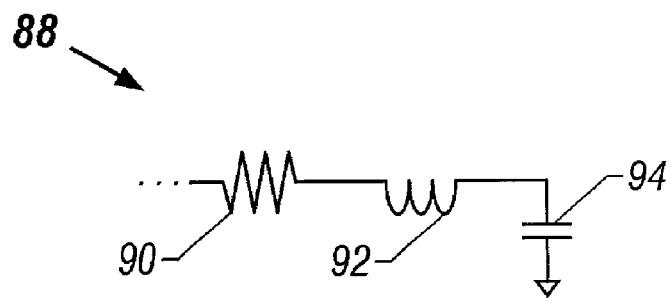
FIG. 5 shows a circuit model for a bulk capacitor or a ceramic capacitor of the board model in accordance with one embodiment of the present invention.

The bulk capacitor $C_{BULK}$ 74a and a ceramic capacitor $C_{CERAMIC}$ 76a of the pathway are further modeled in the schematic 88 shown in FIG. 5 in accordance with one embodiment of the present invention. Both of these capacitors are modeled with a resistor 90, an inductor 92 and a capacitor 94, all connected in series. The resistor 90 and the inductor 92 represent the equivalent series resistance and inductance respectively of the bulk or ceramic capacitor 74a or 76a. The capacitor 94 represents the actual capacitance value of the bulk or ceramic capacitor 74a or 76a.

Returning to FIG. 4, each pathway from the converters is tied to an inductor labeled $L_{PLANE}$ 78 that is connected in series with a resistor labeled $R_{PLANE}$ 80. The inductor 78 and the resistor 80 represent the inductance and resistance of the perforated plane respectively. They in turn, are tied in series to an inductor labeled $L_{VIA}$ 82 that is connected in series with a resistor labeled $R_{VIA}$ 84. The inductor 82 and the resistor 84 represent the inductance and resistance of the board via 44 respectively. The board via, labeled as $V_{BOARD}$ 44 connects the board to the package as shown in FIG. 2. In both FIGS. 4 and 5, the values of each resistor 68a–d, 70a–d, 72a–d, 80, 84, each inductor 78, 82, and each capacitor 74a–d, 76a–d, 94 are selected to accurately simulate the performance of its specific modeled component.

Figure 6:
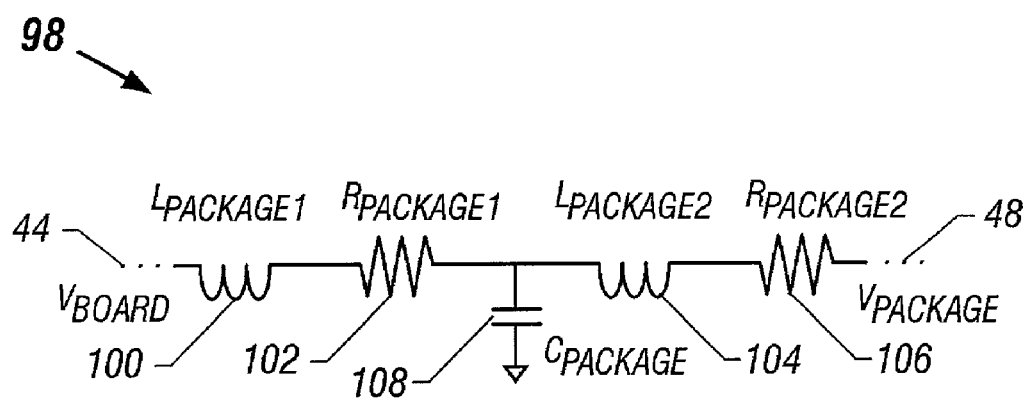
FIG. 6 shows a circuit model for a package model in accordance with one embodiment of the present invention.

FIG. 6 shows a schematic 98 of a circuit model of a package in accordance with one embodiment of the present invention. The board via 44 connects to an inductor labeled $L_{PACKAGE1}$ 100 that is connected in series with a resistor labeled $R_{PACKAGE1}$ 102. They in turn, are tied in series to an inductor labeled $L_{PACKAGE2}$ 104 that is connected in series with a resistor labeled $R_{PACKAGE2}$ 106. A package capacitor, labeled $C_{PACKAGE}$ 108, which is connected to the system ground between $R_{PACKAGE1}$ 102 and $L_{PACKAGE2}$ 104. The inductor $L_{PACKAGE1}$ 100 and the resistor $R_{PACKAGE1}$ 102 represent the inductance and resistance of the package up to the package capacitor 108 respectively. The inductor $L_{PACKAGE2}$ 104 and the resistor $R_{PACKAGE2}$ 106 represent the inductance and resistance of the package after the package capacitor 108 respectively.

Figure 7:
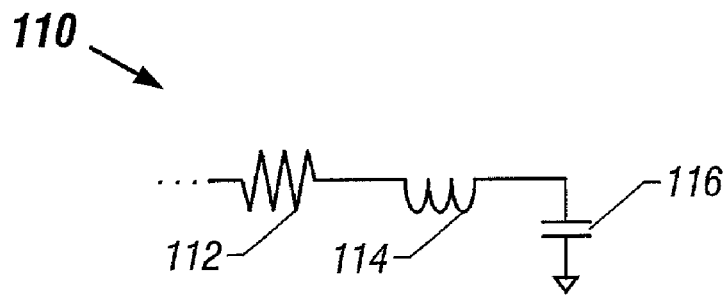
FIG. 7 shows a circuit model for a package capacitor of a package model in accordance with one embodiment of the present invention.

The package capacitor $C_{PACKAGE}$ 108 is further modeled in the schematic 110 shown in FIG. 7 in accordance with one embodiment of the present invention. The capacitor 108 is modeled with a resistor 112, an inductor 114 and a capacitor 116, all connected in series. The resistor 112 and the inductor 114 represent the equivalent series resistance and inductance respectively of the package capacitor 108. The capacitor 116 represents the actual capacitance value of the package capacitor 108. In both FIGS. 6 and 7, the values of each resistor 102, 106, 112, each inductor 100, 104, 114, and each capacitor 108, 116 are selected to accurately simulate the performance of its specific modeled component.

Figure 8A:
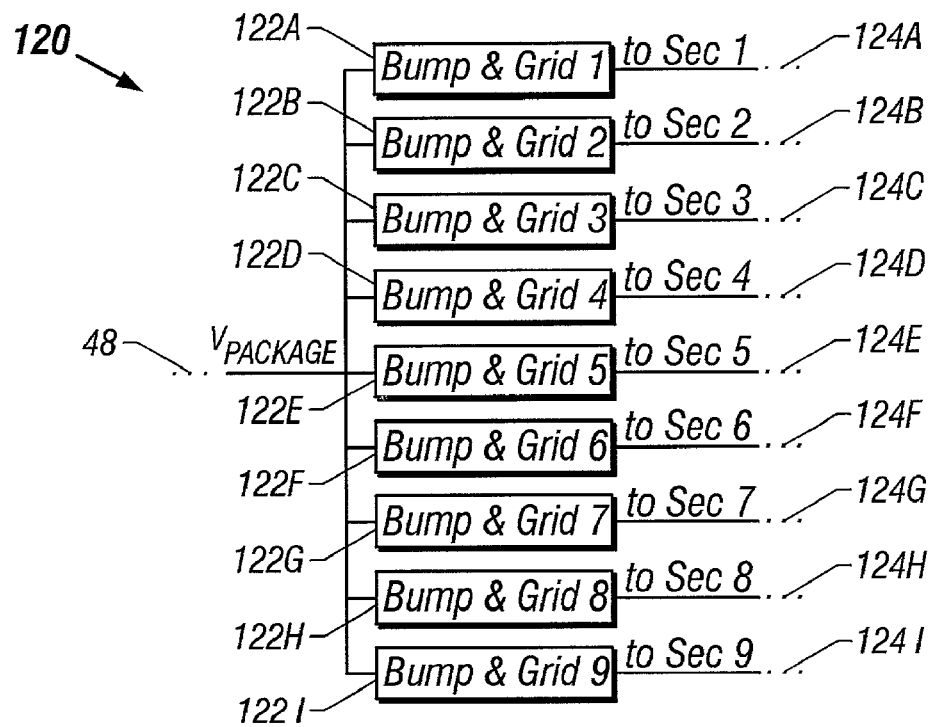
FIG. 8a shows a block diagram of bump and grid models of a chip model in accordance with one embodiment of the present invention.
Figure 8B:
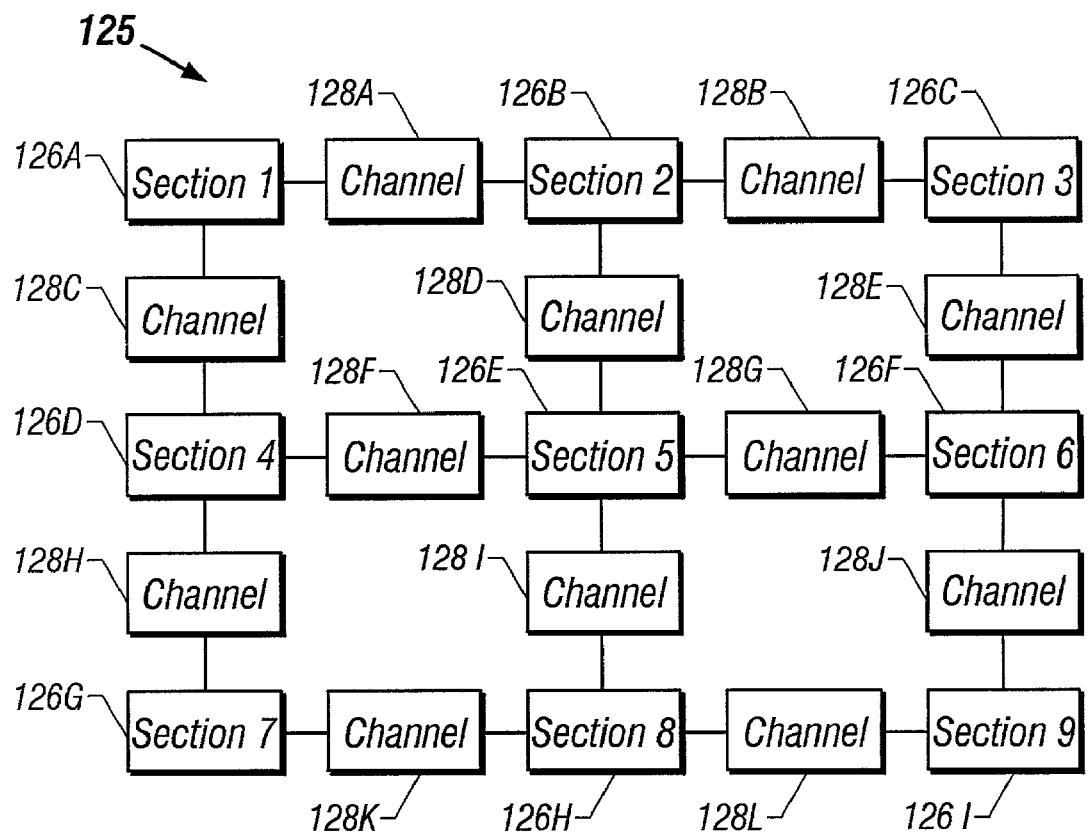
FIG. 8b shows a block diagram of channel models and section models of a chip model in accordance with one embodiment of the present invention.

FIGS. 8a and 8b show a block diagram of a model of a chip in accordance with one embodiment of the present invention. FIG. 8a shows the connection from the package via 48 is split into parallel paths that connect to nine separate models 122a–122i for the bump and grid components of the chip. Each of the bump and grid components 122a–122i is then connect by a via 124a–124i to a designated section model. FIG. 8b shows a inter-connecting grid of nine section models 126a–126i and ten routing channel models 128a–128l. Each section model 126a–126i is connected to other adjacent section models through the routing channel models 128a–128l. The nine sections are arranged in a three-by-three grid with the ten channels serving as connections between each of the sections.

While FIGS. 8a and 8b show nine bump and grid models 122a–122i, nine section models 126a–126i, and ten routing channels 128a–128l, it is fully intended that the scope of this invention covers embodiments with differing numbers of each of these components. For example, the chip could be represented by a four-by-four section model grid. The end result is that different arrangements and numbers of the component blocks shown in FIGS. 8a and 8b are dependent upon the components present in the system and are not limited to the embodiment shown here.

Figure 9A:
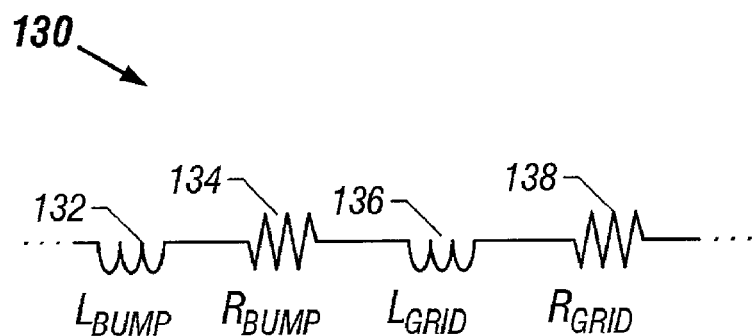
FIG. 9a shows a circuit model for a bump and a grid of a chip model in accordance with one embodiment of the present invention.

FIG. 9a shows a schematic 130 of a circuit model of a bump and grid model in accordance with one embodiment of the present invention. The model includes an inductor labeled $L_{BUMP}$ 132 that is connected in series with a resistor labeled $R_{BUMP}$ 134. They in turn, are tied in series to an inductor labeled $L_{GRID}$ 136 that is connected in series with a resistor labeled $R_{GRID}$ 138. The inductor $L_{BUMP}$ 132 and the resistor $R_{BUMP}$ 134 represents the inductance and resistance of the bump respectively. The inductor $L_{GRID}$ 136 and the resistor $R_{GRID}$ 138 represent the inductance and resistance of the grid respectively.

Figure 9B:
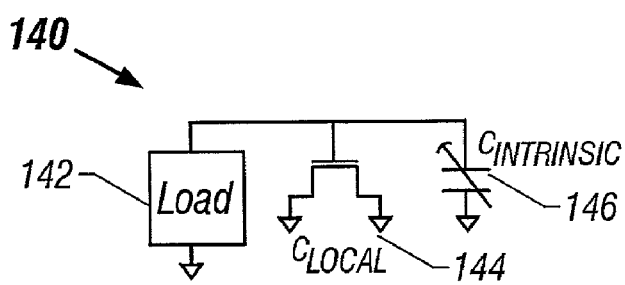
FIG. 9b shows a circuit model for a section segment of a chip model in accordance with one embodiment of the present invention.

FIG. 9b shows a schematic 140 of a circuit model of a section model in accordance with one embodiment of the present invention. The section model, in general, represents a physical section of the chip. The model includes a load 132 that is connected a transistor labeled $C_{LOCAL}$ 144 and a voltage controlled capacitor labeled $C_{INTRINSIC}$ 146. All of these devices are connected together in parallel. The load 132 represents a load model for that section of the chip. The load model may be a voltage controlled resistor for AC analysis or a current source for transient simulations. The transistor $C_{LOCAL}$ 144 represents the local high frequency capacitors. The capacitor $C_{INTRINSIC}$ 146 represents the intrinsic transistor capacitance of the section of the chip.

Figure 9C:
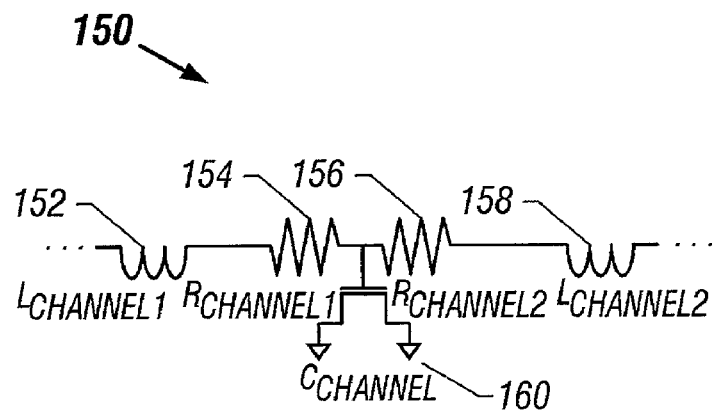
FIG. 9c shows a circuit model for a channel segment of a chip model in accordance with one embodiment of the present invention.

FIG. 9c shows a schematic 150 of a circuit model of a channel model in accordance with one embodiment of the present invention. The model 150 includes an inductor labeled $L_{CHANNEL1}$ 152 that is connected in series with a resistor labeled $R_{CHANNEL1}$ 154. They in turn, are tied in series to a resistor labeled $R_{CHANNEL2}$ 156 that is connected in series with an inductor labeled $L_{CHANNEL2}$ 158. A transistor, labeled $C_{CHANNEL}$ 160, is connected to the system ground between $R_{CHANNEL1}$ 154 and $R_{CHANNEL2}$ 156. The inductors, $L_{CHANNEL1}$ 152 and $L_{CHANNEL2}$ 158, and the resistors, $R_{CHANNEL1}$ 154 and $R_{CHANNEL2}$ 158, represent the inductance and resistance between the connected sections respectively. The transistor $C_{CHANNEL}$ 160 represents the capacitance of the routing channels. In FIGS. 9a, 9b, and 9c, the values of each resistor 134, 138, 154, 156, each inductor 132, 136, 152, 158, each transistor 144, 160, each load 142, and each capacitor 146 are selected to accurately simulate the performance of its specific modeled component.

The resulting model represents an advantage in modeling of power systems by providing a low complexity model with an excellent simulation time. The model further provides flexibility in accurately modeling the power system in AC analysis as well as providing analysis of transient signals such as current spikes of different magnitudes and frequencies.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for modeling a power system of a microprocessor based system, comprising:
    a plurality of power converter models;
    a board model that receives an output from the plurality of power converter models;
    a package model that receives an output from the board model; and
    a chip model that receives an output from the package model, wherein the chip model further comprises:
        a plurality of bump and grid models;
        a plurality of section models that receives a plurality of outputs from the plurality of bump and grid models, wherein each of the plurality of section models further comprises a load model; and
        a plurality of channel models that interconnect the plurality of section models.

2. The apparatus of claim 1, wherein the plurality of power converter models comprises a plurality of DC to DC power converter models.

3. The apparatus of claim 1, wherein the plurality of power converter models comprises four DC to DC power converter models.

4. The apparatus of claim 1, wherein the plurality of bump and grid models comprises nine bump and grid models.

5. The apparatus of claim 1, wherein the load model comprises a voltage controlled resistor.

6. The apparatus of claim 1, wherein the load model comprises a current source.

7. The apparatus of claim 1, wherein the plurality of section models are arranged in an interconnecting grid.

8. The apparatus of claim 7, wherein the interconnecting grid is generally square shaped.

9. The apparatus of claim 1, wherein the plurality of section models comprises nine section models.

10. The apparatus of claim 9, wherein the plurality of the section models are arranged in a three section by three section grid.

11. The apparatus of claim 1, wherein the plurality of the channel models comprises ten section models.

12. An apparatus for modeling a power system of a microprocessor based system, comprising:
  means for modeling a power converter;
  means for modeling a board that receives an output from the means for modeling a power converter;
  means for modeling a package that receives an output from the means for modeling a board; and
  means for modeling a chip that receives an output from the means for modeling a package, wherein the means for modeling a chip further comprises:
    means for modeling a plurality of bumps and grids;
    means for modeling a plurality of sections that receive a plurality of outputs from the plurality of bumps and grids, wherein each of the plurality of sections further comprises a load model; and
    means for modeling a plurality of channel models that interconnect the plurality of sections.

13. A method for modeling a power system of a microprocessor based system, comprising:
  modeling a plurality of power converters;
  modeling a board that receives an output from the plurality of power converter;
  modeling a package that receives an output from the board; and
  modeling a chip that receives an output from the package, wherein modeling a chip further comprises:
  modeling a plurality of bump and grid components;
  modeling a plurality of chip sections that receives an output from the plurality of bump and arid components, wherein modeling a plurality of chip sections further comprises modeling a load; and
  modeling a plurality chip channels that interconnects the plurality of chip sections.

14. The method of claim 13, wherein the plurality of power converters comprises four DC to DC power converters.

15. The method of claim 13, wherein modeling a plurality of chip sections forms a generally square shaped grid.

16. The method of claim 15, wherein the generally square shaped grid comprises a three section by three section grid.

17. The method of claim 13, wherein the load is modeled as a voltage controlled resistor.

18. The method of claim 13, wherein the load is modeled as a current source.

19. An apparatus for modeling a power system of a microprocessor chip, comprising:
  a plurality of bump and grid models;
  a plurality of section models that receives a plurality of outputs from the plurality of bump and grid models, wherein the plurality of section models further comprises a load model; and
  a plurality of channel models that interconnect the plurality of section models.

20. The apparatus of claim 19, wherein the load model further comprises a voltage controlled resistor.

21. The apparatus of claim 19, wherein the load model further comprises a current source.

22. The apparatus of claim 19, wherein the plurality of section models are arranged in an interconnecting grid.

23. The apparatus of claim 22, wherein the interconnecting grid in generally square shaped.

24. The apparatus of claim 19, wherein the plurality of section models comprises nine section models.

25. The apparatus of claim 24, wherein the plurality of section models are arranged in a three section by three section grid.

26. An apparatus for modeling a power system of a microprocessor chip, comprising:
  means for modeling a plurality of bumps and grids;
  means for modeling a plurality of sections that receives a plurality of outputs from the plurality of bumps and grids, wherein means for modeling a plurality of sections further comprises means for modeling a load; and
  means for modeling a plurality of channels that interconnect the plurality of sections.

27. A method for modeling a power system of a microprocessor chip, comprising:
  modeling a plurality of bump and grid components;
  modeling a plurality of chip sections that receives an output from the plurality of bump and grid components, wherein modeling a plurality of chip sections further comprises modeling a load; and
  modeling a plurality chip channels that interconnect the plurality of chip sections.

28. The method of claim 27, wherein modeling a plurality of chip sections forms a generally square shaped grid.

29. The method of claim 28, wherein the generally square shaped grid is a three section by three section grid.

30. The method of claim 27, wherein the load is modeled as a voltage controlled resistor.

31. The method of claim 27, wherein the load is modeled as a current source.

* * * * *

UNITED STATES PATENT AND TRADEMARK OFFICE
CERTIFICATE OF CORRECTION

PATENT NO. : 7,013,254 B2
DATED : March 14, 2006
INVENTOR(S) : Claude R. Gauthier et al.

It is certified that error appears in the above-identified patent and that said Letters Patent is hereby corrected as shown below:

Column 7,
Line 49, replace "arid" with -- grid --.

Signed and Sealed this

Thirteenth Day of June, 2006

JON W. DUDAS
*Director of the United States Patent and Trademark Office*